(12) United States Patent
Lin et al.

(10) Patent No.: US 11,719,965 B2
(45) Date of Patent: Aug. 8, 2023

(54) OPTICAL ISOLATORS

(71) Applicant: Lightel Technologies, Inc., Renton, WA (US)

(72) Inventors: Shyh-Chung Lin, Bellevue, WA (US); Hongyu Hu, Renton, WA (US)

(73) Assignee: Lightel Technologies, Inc., Renton, WA (US)

(*) Notice: Subject to any disclaimer, the term of this patent is extended or adjusted under 35 U.S.C. 154(b) by 463 days.

(21) Appl. No.: 17/123,623

(22) Filed: Dec. 16, 2020

(65) Prior Publication Data

US 2022/0187639 A1    Jun. 16, 2022

(51) Int. Cl.
*G02F 1/09* (2006.01)
*G02B 5/30* (2006.01)
*G02B 27/30* (2006.01)
*G02B 27/28* (2006.01)

(52) U.S. Cl.
CPC .......... *G02F 1/093* (2013.01); *G02B 5/3083* (2013.01); *G02B 27/283* (2013.01); *G02B 27/30* (2013.01)

(58) Field of Classification Search
CPC ..... G02F 1/093; G02B 5/3083; G02B 27/283; G02B 27/30
See application file for complete search history.

(56) References Cited

U.S. PATENT DOCUMENTS

2002/0118434 A1\* 8/2002 Cao .................. G02F 1/093
                                                       359/251

\* cited by examiner

*Primary Examiner* — Edward J Glick
*Assistant Examiner* — William D Peterson
(74) *Attorney, Agent, or Firm* — Han IP PLLC; Andy M. Han

(57) ABSTRACT

An optical isolator device with minimized polarization mode dispersion includes a first polarization splitter/combiner, a non-reciprocal polarization rotator and a second polarization splitter/combiner. Only forward propagation of light is allowed to propagate in the device, with backward optical signal blocked due to non-reciprocal polarization rotation. The optical paths of o-ray and e-ray are arranged to achieve equal optical path lengths, which makes polarization mode dispersion minimal to nonexistent. When symmetrically configured, both polarization mode dispersion (PMD) and polarization dependent loss (PDL) become zero in principle.

14 Claims, 5 Drawing Sheets

OPTICAL ISOLATORS

BACKGROUND

Technical Field

The present invention generally relates to fiber optic communications systems, and more specifically, to a fiber optic isolator for multi-hundred gigabit and above high bit rate applications with minimal to zero polarization mode dispersion (PMD).

Description of Related Art

An optical isolator is a device that allows the transmission of light in only one direction. Optical isolators have been used in fiber optic communications systems to block unwanted back reflection and protect light source from performance deterioration or damage.

Multi-hundred gigabit and above high bit rate optical communications rely on the transmission of data bits in the form of narrow optical pulses with tight timing jitter specifications. As birefringent crystals are usually used in optical isolators, when the pulses pass through the isolator, they are split into two orthogonally polarized light beams, i.e., o-ray and e-ray, which will then travel at different speed in birefringent materials. As a result, the propagation delays experienced by the two beams differ from each other, which is a phenomenon quantified by polarization mode dispersion (PMD).

Such dispersive effect deteriorates the timing jitter performance and the eye opening. Consequently, higher bit error rate (BER) is observed. An optical isolator with minimal to zero PMD reduces this concern significantly.

SUMMARY

An optical isolator with minimal to zero polarization mode dispersion includes two polarization beam splitters/combiners with wedge profiles and a non-reciprocal polarization rotator sandwiched in between. Also, two fiber collimators are used to interface with the input fiber and the output fiber respectively.

In one aspect, the configuration of the optical elements is arranged such that the two orthogonally polarized optical beams, o-ray and e-ray, emerging from the first polarization beam splitter/combiner cross each other, as projected on the incidence plane, at a position before arriving at the second polarization beam splitter/combiner and results in equal total optical path lengths.

In the second aspect, the configuration of the optical elements is arranged such that the two orthogonally polarized optical beams, o-ray and e-ray, emerging from the first polarization beam splitter/combiner becomes e-ray and o-ray respectively in the second polarization beam splitter/combiner.

In the third aspect, when light propagates in the backward direction, the two orthogonally polarized optical beams, o-ray and e-ray, emerging from the second polarization beam splitter/combiner remain as o-ray and e-ray respectively in the first polarization beam splitter/combiner due to non-reciprocal polarization rotation.

In one embodiment, the optical isolator may include two polarization beam splitter/combiner placed next to the input and output optical collimators respectively.

In the other embodiment, the optical isolator may include two additional wedge prisms, one is placed between the input optical collimator and polarization beam splitter/combiner, and the other is placed between output optical collimator and the output polarization beam splitter/combiner.

In another embodiment, the optical isolator may include two additional wedge prisms, one is placed between the input polarization beam splitter/combiner and the non-reciprocal polarization rotator, and the other is placed between the non-reciprocal polarization rotator and the output polarization beam splitter/combiner.

In yet another embodiment, the optical isolator may include one additional wedge prism placed between the output polarization beam splitter/combiner and the non-reciprocal polarization rotator.

In yet another embodiment, the optical isolator, with built-in Faraday rotator mirror, may include one additional wedge prism having a partially reflecting surface placed between the output polarization beam splitter/combiner and the non-reciprocal polarization rotator.

Various embodiments are disclosed below, with reference to the attached figures to provide better understanding of the principles and benefits of present invention.

BRIEF DESCRIPTION OF THE DRAWINGS

The accompanying drawings are included to aid further understanding of the present disclosure, and are incorporated in and constitute a part of the present disclosure. The drawings illustrate a select number of embodiments of the present disclosure and, together with the detailed description below, serve to explain the principles of the present disclosure. It is appreciable that the drawings are not necessarily to scale, as some components may be shown to be out of proportion to size in actual implementation in order to clearly illustrate the concept of the present disclosure.

DETAILED DESCRIPTION OF PREFERRED EMBODIMENTS

Overview

Various implementations of the present disclosure and related inventive concepts are described below. It should be acknowledged, however, that the present disclosure is not limited to any particular manner of implementation, and that the various embodiments discussed explicitly herein are primarily for purposes of illustration.

Various proposed designs, schemes and embodiments in accordance with the present disclosure of an optical isolator, which has minimal to zero polarization mode dispersion, are described in detail below. This is realized by the deployment of a design with optical paths beam-crossing and the o-ray/e-ray polarization switching.

The following provides a description of the working principle of the optical isolator system. In general, an optical signal is collimated by an input optical collimator, which is then launched into a first birefringent polarization beam splitter/combiner. The collimated light beam is split into an o-ray and an e-ray with orthogonal polarizations. The polarizations of both rays are rotated as they pass through a non-reciprocal polarization rotator. These two rays cross each other, as projected on the incidence plane, before they arrive at a second birefringent polarization beam splitter/combiner, which recombines the rotated o-ray and the rotated e-ray, or e-ray and o-ray respectively in the second polarization beam splitter/combiner. The optical paths of the beams are configured so that the total optical path lengths of the two beams are equal, which results in zero polarization mode dispersion in principle.

When symmetrically configured, both polarization mode dispersion (PMD) and polarization dependent loss (PDL) become zero in principle.

Figure 1A:
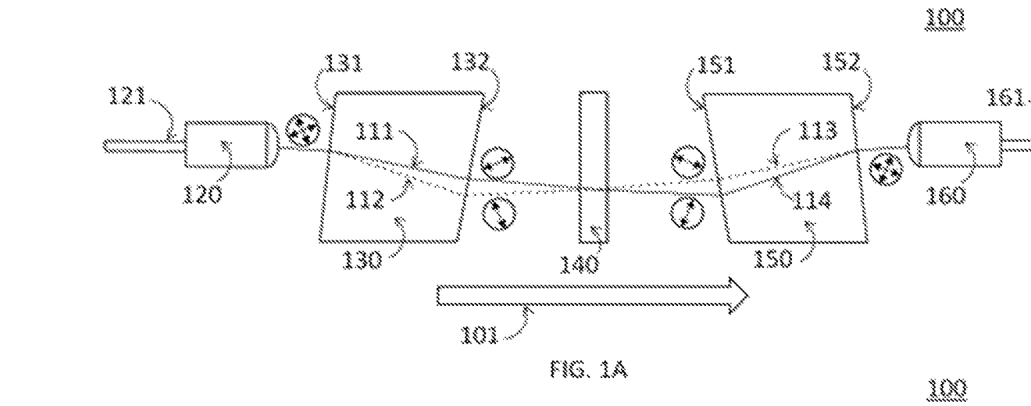
FIG. 1A and FIG. 1B are diagrams showing side view of forward and backward beam propagation through an optical assembly in accordance with one embodiment of the present disclosure.
Figure 1B:
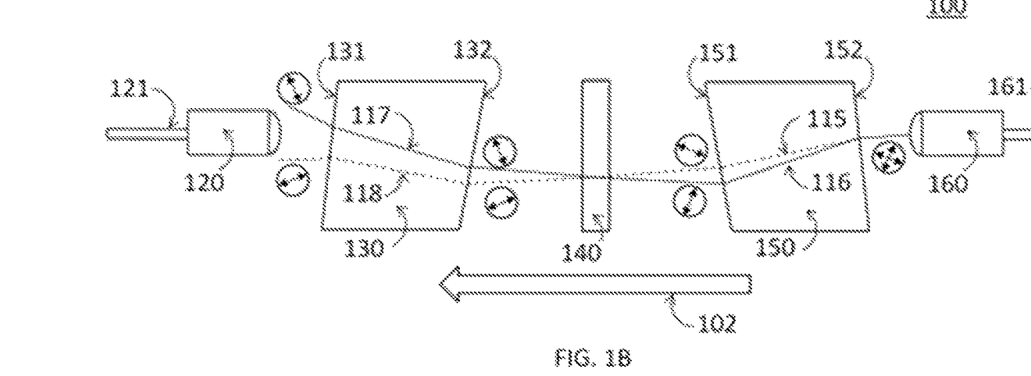

One embodiment of the optical isolator is depicted in a side view in FIG. 1A and FIG. 1B. The isolator assembly 100 comprises an input optical collimator 120 having an input fiber port 121, a first polarization beam splitter/combiner 130, a non-reciprocal polarization rotator 140, a second polarization beam splitter/combiner 150, and an output optical collimator 160 having an output fiber port 161.

Input optical collimator 120 comprises a lens to collimate the divergent light beam emerging from the input fiber port 121, which is generally secured inside a ferrule. Examples of lens include convex lens and gradient-index lens. The output optical collimator 160 has the same structure and configuration as the input optical collimator 120. Both the collimated beams out of the input collimator 120 and output collimator 160 are tilted and make an angle to a longitudinal optical axis of the optical isolator assembly.

The first polarization beam splitter/combiner 130 comprises a birefringent material having a wedge profile, which defines a tilted input surface 131 and a tilted output surface 132. Examples of such birefringent materials include, but are not limited to, Calcite, YVO4, and Lithium niobate. An example of optic axis of the birefringent polarization beam splitter/combiner 130 lies on a plane transverse to the longitudinal optical axis of the isolator assembly. The second polarization beam splitter/combiner 150 having a tilted input surface 151 and a tilted output surface 152 has an identical structure to that of the first polarization beam splitter/combiner 130. The wedge angle of surface 151 is the same as that of surface 132 and the wedge angle of surface 152 is the same as that of surface 131. However, referring to FIG. 1A and FIG. 1B, wedge 130 and wedge 150 are configured opposing to each other in this optical isolator assembly. When projected on the transverse plane to the optical axis of the isolator assembly, the optic axis of the second birefringent polarization beam splitter/combiner 150 is rotated 45 degrees from the optic axis of the first polarization beam splitter/combiner 130 in opposite direction to polarization rotation afforded by the non-reciprocal polarization rotator 140 described below.

Non-reciprocal polarization rotator 140 comprises a magneto-optic rotator crystal or a magneto-optic rotator glass having permanent internal magnetic field, or alternatively in external magnet (not shown in the figure). The magnetic field is approximately along the direction of light propagation or the opposite direction. The rotator 140 rotates the polarization of incident light beam by 45 degrees. The non-reciprocal polarization rotator 140 may be any Faraday rotator crystal or Faraday rotator glass.

Referring to FIG. 1A, an input optical signal is launched into the input fiber port 121 and propagates along the forward direction 101. The input optical signal is collimated into a light beam via the input optical collimator 120. The collimated beam is then split into two orthogonally polarized beams, i.e., an o-ray 111 and an e-ray 112, by the first polarization beam splitter/combiner 130, which are both incident on the non-reciprocal polarization rotator 140. The wedge angles of surface 131 and surface 132 are chosen such that the angularly separated o-ray 111 and e-ray 112 cross each other, when projected onto the incidence plane, at a position before arriving at the second polarization beam splitter/combiner 150. The polarizations of the two beams are each rotated by 45 degrees after passing through the rotator 140, and then recombined by the second polarization beam splitter/combiner 150 having an optic axis of 45 degrees with respect to that of the first polarization beam splitter/combiner 130, wherein the o-ray 111 is now turned into e-ray 114 and the e-ray 112 is now turned into o-ray 113. The combined optical signal is coupled into the output fiber port 161 by the output optical collimator 160. FIG. 1A also shows the change of polarization direction viewed from input port 121 towards output port 161, as arrows inside circles.

The polarization mode dispersion is greatly reduced to minimal or even zero by the utilization of beam-crossing and o-ray/e-ray polarization switching. The total optical path lengths of the two beams split by the first polarization beam splitter/combiner 130 are the following: optical path length of o-ray 111 until the crossing point plus optical path length of e-ray 114 beyond the crossing point; and optical path length of e-ray 112 until the crossing point plus optical path length of o-ray 113 beyond the crossing point. When designing the structure, configuration and orientation of the components 120, 130, 140, 150 and 160, the difference between the optical path length of o-ray 111 and the optical path length of e-ray 112 until the crossing point is compensated by the difference between the optical path length of e-ray 114 and the optical path length of o-ray 113 beyond the crossing point. Furthermore, in a special case, when the elements 120, 130, 140, 150 and 160 are designed to be symmetric about the beam intersection, the optical paths are also symmetric, wherein the optical path length of o-ray 111 until the crossing point is equal to the optical path length of o-ray 113 beyond the crossing point, and the optical path length of e-ray 112 until the crossing point is equal to the optical path length of e-ray 114 beyond the crossing point. The total optical path lengths of the two beams are identical in this case. Therefore, these beams are coupled into the output fiber port 161 simultaneously and both the polarization mode dispersion and polarization dependent loss are zeroed in principle.

Referring to FIG. 1B, in the reverse direction 102, an optical signal launched from the output fiber port 161 is collimated by the output optical collimator 160 and split into two polarized beams, o-ray 115 and e-ray 116, via the second polarization beam splitter/combiner 150. After passing through the rotator 140 and arriving at the first polarization beam splitter/combiner 130, because the rotation is non-reciprocal with the rotation in the forward direction 101, the rotated o-ray 115 becomes 118 which remains o-ray in polarization beam splitter/combiner 130, and the rotated e-ray 116 becomes 117 which remains e-ray in polarization beam splitter/combiner 130. Consequently, the beams emerging from the surface 131 are angularly deviated and cannot be coupled into the input fiber port 121 by the input optical collimator 120. The change of polarization direction viewed from input port 121 towards output port 161 is shown in FIG. 1B as arrows inside circles. In summary, the backward propagation of optical signal is blocked by the optical isolator assembly 100.

Figure 2A:
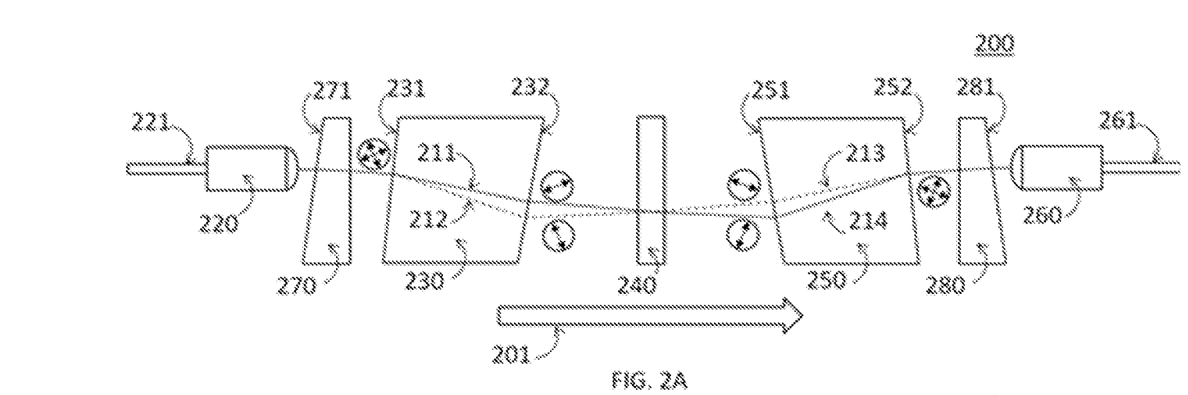
FIG. 2A and FIG. 2B are diagrams showing side view of forward and backward beam propagation through an optical assembly in accordance with the other embodiment of the present disclosure.
Figure 2B:
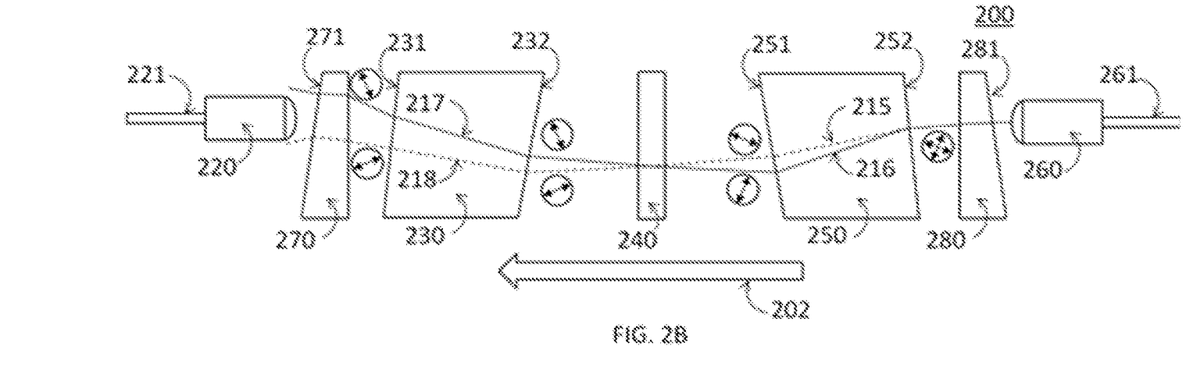

Each of FIG. 2A and FIG. 2B is a side view of an optical isolator assembly 200 according to a second embodiment of the invention. The embodiment differs from the first embodiment in the addition of two wedge prisms, 270 and 280, at input and output sides respectively. The isolator assembly 200 includes an input optical collimator 220 having an input fiber port 221, a first wedge prism 270, a first polarization beam splitter/combiner 230 having a wedge profile with a tilted input surface 231 and a tilted output surface 232, a non-reciprocal polarization rotator 240, a second polarization beam splitter/combiner 250 having a wedge profile with a tilted input surface 251 and a tilted output surface 252, a second wedge prism 280, and an output optical collimator 260 having an output fiber port 261.

Input optical collimator 220 comprises a lens to collimate the divergent light beam emerging from the input fiber port 221, which is generally secured inside a ferrule. Examples of lens include convex lens and gradient-index lens. The output optical collimator 260 has the same structure and configuration as the input optical collimator 220. In the second embodiment, both the collimated beams out of the input optical collimator 220 and output optical collimator 260 are aligned parallel to a longitudinal optical axis of the isolator assembly.

A first wedge prism 270 having a tilted input surface 271 is inserted between the first optical collimator 220 and the first polarization beam splitter/combiner 230 to provide the proper beam deflection. The material used for the wedge prism 270 may be any transparent optical glass such as BK7 and SF11. The second wedge prism 280 having a tilted output surface 281 has an identical structure to that of the first wedge prism 270, which is used to enable the collection of the output beam by the second optical collimator 260. It is noted that although in the present embodiment, only the input surface 271 of the first wedge prism 270 and the output surface 281 of the second wedge prism 280 are tilted, the invention is not limited in scope in that respect. For example, the output surface of wedge 270 and the input surface of wedge 280 may also be tilted.

The first polarization beam splitter/combiner 230 comprises a birefringent material having a wedge profile, which defines a tilted input surface 231 and a tilted output surface 232. Examples of such birefringent materials include, but are not limited to, Calcite, YVO4, and Lithium niobate. An example of optic axis of the birefringent polarization beam splitter/combiner 230 lies on a plane transverse to the longitudinal optical axis of the isolator assembly. The second polarization beam splitter/combiner 250 having a tilted input surface 251 and a tilted output surface 252 has an identical structure to that of the first polarization beam splitter/combiner 230. The wedge angle of surface 251 is the same as that of surface 232 and the wedge angle of surface 252 is the same as that of surface 231. However, referring to FIG. 2A and FIG. 2B, wedge 230 and wedge 250 are configured opposing to each other in this optical isolator assembly. When projected on the transverse plane to the optical axis of the isolator assembly, the optic axis of the second birefringent polarization beam splitter/combiner 250 is rotated 45 degrees from the optic axis of the first polarization beam splitter/combiner 230 in opposite direction to polarization rotation afforded by the non-reciprocal polarization rotator 240 described below.

Non-reciprocal polarization rotator 240 comprises a magneto-optic rotator crystal or a magneto-optic rotator glass having permanent internal magnetic field, or alternatively in external magnet (not shown in the figure). The magnetic field is approximately along the direction of light propagation or the opposite direction. The rotator 240 rotates the polarization of incident light beam by 45 degrees. The non-reciprocal polarization rotator 240 may be any Faraday rotator crystal or Faraday rotator glass.

Referring to FIG. 2A, an input optical signal is launched into the input fiber port 221 and propagates along the forward direction 201. The input optical signal is collimated into a light beam via the input optical collimator 220. The collimated beam, deflected by the first wedge prism 270, is then split into two orthogonally polarized beams, i.e., an o-ray 211 and an e-ray 212, by the first polarization beam splitter/combiner 230, which are both incident on the non-reciprocal polarization rotator 240. The wedge angles of surface 231 and surface 232 are chosen such that the angularly separated o-ray 211 and e-ray 212 cross each other, when projected onto the incidence plane, at a position before arriving at the second polarization beam splitter/combiner 250. The polarizations of the two beams are each rotated by 45 degrees after passing through the rotator 240, and then recombined by the second polarization beam splitter/combiner 250 having an optic axis of 45 degrees with respect to that of the first polarization beam splitter/combiner 230, wherein the o-ray 211 is now turned into e-ray 214 and the e-ray 212 is now turned into o-ray 213. The combined optical signal, deflected by the second wedge prism 280, is coupled into the output fiber port 261 by the output optical collimator 260. FIG. 2A also shows the change of polarization direction viewed from input port 221 towards output port 261, as arrows inside circles.

The polarization mode dispersion is greatly reduced to minimal or even zero by the utilization of beam-crossing and o-ray/e-ray polarization switching. The total optical path lengths of the two beams split by the first polarization beam splitter/combiner 230 are the following: optical path length of o-ray 211 until the crossing point plus optical path length of e-ray 214 beyond the crossing point; and optical path length of e-ray 212 until the crossing point plus optical path length of o-ray 213 beyond the crossing point. When designing the structure, configuration and orientation of the components 220, 270, 230, 240, 250, 280, and 260, the difference between the optical path length of o-ray 211 and the optical path length of e-ray 212 until the crossing point is compensated by the difference between the optical path length of e-ray 214 and the optical path length of o-ray 213 beyond the crossing point. Furthermore, in a special case, when the elements 220, 270, 230, 240, 250, 280, and 260 are designed to be symmetric about the beam intersection, the optical paths are also symmetric, wherein the optical path length of o-ray 211 until the crossing point is equal to the optical path length of o-ray 213 beyond the crossing point, and the optical path length of e-ray 212 until the crossing point is equal to the optical path length of e-ray 214 beyond the crossing point. The total optical path lengths of the two beams are identical in this case. Therefore, these beams are coupled into the output fiber port 261 simultaneously and both the polarization mode dispersion and polarization dependent loss are zeroed in principle.

Referring to FIG. 2B, in the reverse direction 202, an optical signal launched from the output fiber port 261 is collimated by the output optical collimator 260, deflected by the second wedge prism 280, and split into two polarized beams, o-ray 215 and e-ray 216, via the second polarization beam splitter/combiner 250. After passing through the rotator 240 and arriving at the first polarization beam splitter/combiner 230, because the rotation is non-reciprocal with the rotation in the forward direction 201, the rotated o-ray 215 becomes 218 which remains o-ray in polarization beam splitter/combiner 230, and the rotated e-ray 216 becomes 217 which remains e-ray in polarization beam splitter/combiner 230. Consequently, the beams emerging from the surface 231, deflected by the first wedge prism 270, are angularly deviated and cannot be coupled into the input fiber port 221 by the input optical collimator 220. The change of polarization direction viewed from input port 221 towards output port 261 is shown in FIG. 2B as arrows inside circles. In summary, the backward propagation of optical signal is blocked by the optical isolator assembly 200.

Figure 3A:
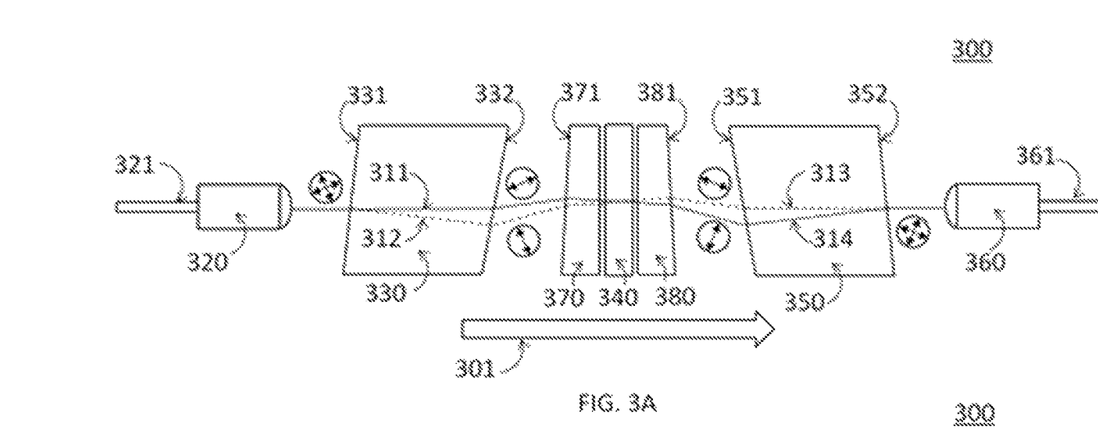
FIG. 3A and FIG. 3B are diagrams showing side view of forward and backward beam propagation through an optical assembly in accordance with another embodiment of the present disclosure.
Figure 3B:
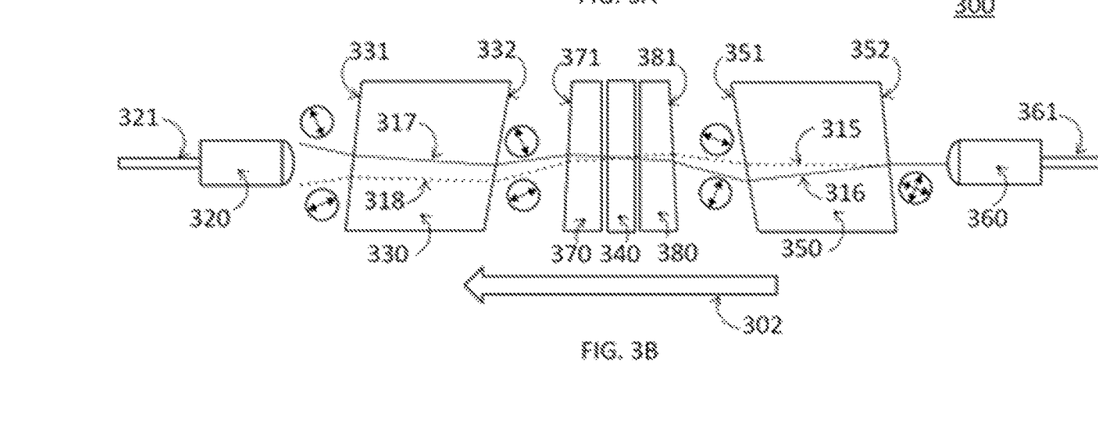

Each of FIG. 3A and FIG. 3B is a side view of an optical isolator assembly 300 according to a third embodiment of the invention. The embodiment differs from the first embodiment in the addition of two wedge prisms, 370 and 380, placed at the two sides of the non-reciprocal polarization rotator. The isolator assembly 300 includes an input optical collimator 320 having an input fiber port 321, a first polarization beam splitter/combiner 330 having a wedge profile with a tilted input surface 331 and a tilted output surface 332, a first wedge prism 370, a non-reciprocal polarization rotator 340, a second wedge prism 380, a second polarization beam splitter/combiner 350 having a wedge profile with a tilted input surface 351 and a tilted output surface 352, and an output optical collimator 360 having an output fiber port 361.

Input optical collimator 320 comprises a lens to collimate the divergent light beam emerging from the input fiber port 321, which is generally secured inside a ferrule. Examples of lens include convex lens and gradient-index lens. The output optical collimator 360 has the same structure and configuration as the input optical collimator 320. In the third embodiment, both the collimated beams out of the input optical collimator 320 and output optical collimator 360 are aligned parallel to a longitudinal optical axis of the isolator assembly.

A first wedge prism 370 having a tilted input surface 371 is inserted between the first polarization beam splitter/combiner 330 and the non-reciprocal polarization rotator 340, and a second wedge prism 380 having a tilted output surface 381 is inserted between the non-reciprocal polarization rotator 340 and the second polarization beam splitter/combiner 350 to provide the proper beam deflection. The material used for the wedge prism 370 may be any transparent optical glass such as BK7 and SF11. The second wedge prism 380 having a tilted output surface 381 has an identical structure to that of the first wedge prism 370, which is used to enable the collection of the output beam by the second optical collimator 360. It is noted that although in the present embodiment, only the input surface 371 of the first wedge prism 370 and the output surface 381 of the second wedge prism 380 are tilted, the invention is not limited in scope in that respect. For example, the output surface of wedge 370 and the input surface of wedge 380 may also be tilted.

The first polarization beam splitter/combiner 330 comprises a birefringent material having a wedge profile, which defines a tilted input surface 331 and a tilted output surface 332. Examples of such birefringent materials include, but are not limited to, Calcite, YVO4, and Lithium niobate. An example of optic axis of the birefringent polarization beam splitter/combiner 330 lies on a plane transverse to the longitudinal optical axis of the isolator assembly. The second polarization beam splitter/combiner 350 having a tilted input surface 351 and a tilted output surface 352 has an identical structure to that of the first polarization beam splitter/combiner 330. The wedge angle of surface 351 is the same as that of surface 332 and the wedge angle of surface 352 is the same as that of surface 331. However, referring to FIG. 3A and FIG. 3B, wedge 330 and wedge 350 are configured opposing to each other in this optical isolator assembly. When projected on the transverse plane to the optical axis of the isolator assembly, the optic axis of the second birefringent polarization beam splitter/combiner 350 is rotated 45 degrees from the optic axis of the first polarization beam splitter/combiner 330 in opposite direction to polarization rotation afforded by the non-reciprocal polarization rotator 340 described below.

Non-reciprocal polarization rotator 340 comprises a magneto-optic rotator crystal or a magneto-optic rotator glass having permanent internal magnetic field, or alternatively in external magnet (not shown in the figure). The magnetic field is approximately along the direction of light propagation or the opposite direction. The rotator 340 rotates the polarization of incident light beam by 45 degrees. The non-reciprocal polarization rotator 340 may be any Faraday rotator crystal or Faraday rotator glass.

Referring to FIG. 3A, an input optical signal is launched into the input fiber port 321 and propagates along the forward direction 301. The input optical signal is collimated into a light beam via the input optical collimator 320. The collimated beam is then split into two orthogonally polarized beams, i.e., an o-ray 311 and an e-ray 312, by the first polarization beam splitter/combiner 330, which, deflected by the first wedge prism 370, are both incident on the non-reciprocal polarization rotator 340. The wedge angles of surface 331 and surface 332 are chosen such that the angularly separated o-ray 311 and e-ray 312 cross each other, when projected onto the incidence plane, at a position before arriving at the second polarization beam splitter/combiner 350. The polarizations of the two beams are each rotated by 45 degrees after passing through the rotator 340, and, deflected by the second wedge prism 380, then recombined by the second polarization beam splitter/combiner 350 having an optic axis of 45 degrees with respect to that of the first polarization beam splitter/combiner 330, wherein the o-ray 311 is now turned into e-ray 314 and the e-ray 312 is now turned into o-ray 313. The combined optical signal is coupled into the output fiber port 361 by the output optical collimator 360. FIG. 3A also shows the change of polarization direction viewed from input port 321 towards output port 361, as arrows inside circles.

The polarization mode dispersion is greatly reduced to minimal or even zero by the utilization of beam-crossing and o-ray/e-ray polarization switching. The total optical path lengths of the two beams split by the first polarization beam splitter/combiner 330 are the following: optical path length of o-ray 311 until the crossing point plus optical path length of e-ray 314 beyond the crossing point; and optical path length of e-ray 312 until the crossing point plus optical path length of o-ray 313 beyond the crossing point. When designing the structure, configuration and orientation of the components 320, 330, 370, 340, 380, 350, and 360, the difference between the optical path length of o-ray 311 and the optical path length of e-ray 312 until the crossing point is compensated by the difference between the optical path length of e-ray 314 and the optical path length of o-ray 313 beyond the crossing point. Furthermore, in a special case, when the elements 320, 330, 370, 340, 380, 350, and 360, are designed to be symmetric about the beam intersection, the optical paths are also symmetric, wherein the optical path length of o-ray 311 until the crossing point is equal to the optical path length of o-ray 313 beyond the crossing point, and the optical path length of e-ray 312 until the crossing point is equal to the optical path length of e-ray 314 beyond the crossing point. The total optical path lengths of the two beams are identical in this case. Therefore, these beams are coupled into the output fiber port 361 simultaneously and both the polarization mode dispersion and polarization dependent loss are zeroed in principle.

Referring to FIG. 3B, in the reverse direction 302, an optical signal launched from the output fiber port 361 is collimated by the output optical collimator 360 and split into two polarized beams, o-ray 315 and e-ray 316, via the second polarization beam splitter/combiner 350, and deflected by the second wedge prism 380. After passing through the rotator 340, and, deflected by the first wedge prism 370, arriving at the first polarization beam splitter/combiner 330, because the rotation is non-reciprocal with the rotation in the forward direction 301, the rotated o-ray 315 becomes 318 which remains o-ray in polarization beam splitter/combiner 330, and the rotated e-ray 316 becomes 317 which remains e-ray in polarization beam splitter/combiner 330. Consequently, the beams emerging from the surface 331 are angularly deviated and cannot be coupled into the input fiber port 321 by the input optical collimator 320. The change of polarization direction viewed from input port 321 towards output port 361 is shown in FIG. 3B as arrows inside circles. In summary, the backward propagation of optical signal is blocked by the optical isolator assembly 300.

Figure 4A:
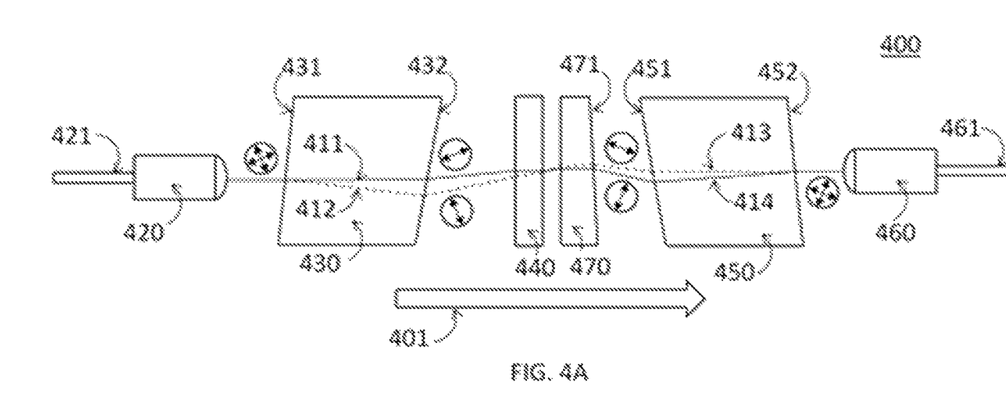
FIG. 4A and FIG. 4B are diagrams showing side view of forward and backward beam propagation through an optical assembly in accordance with yet another embodiment of the present disclosure.
Figure 4B:
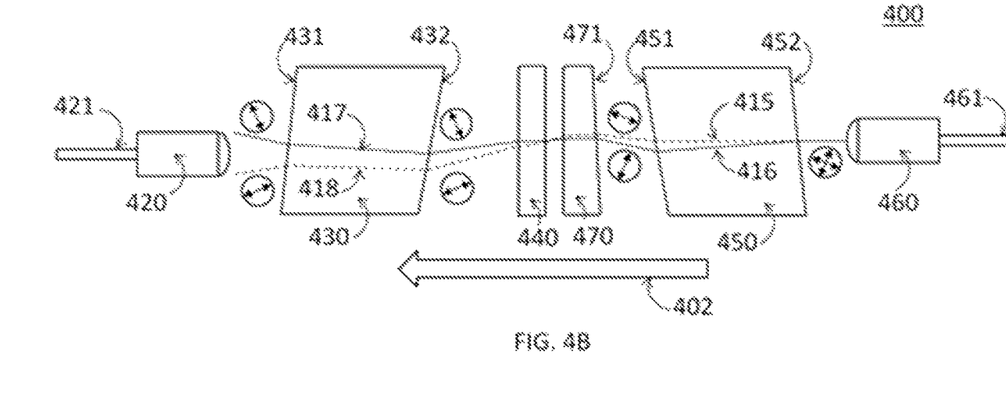

Each of FIG. 4A and FIG. 4B is a side view of an optical isolator assembly 400 according to a fourth embodiment of the invention. The embodiment differs from the first embodiment in the addition of one wedge prism, 470, placed next to the non-reciprocal polarization rotator. The isolator assembly 400 includes an input optical collimator 420 having an input fiber port 421, a first polarization beam splitter/combiner 430 having a wedge profile with a tilted input surface 431 and a tilted output surface 432, a non-reciprocal polarization rotator 440, a wedge prism 470, a second polarization beam splitter/combiner 450 having a wedge profile with a tilted input surface 451 and a tilted output surface 452, and an output optical collimator 460 having an output fiber port 461.

Input optical collimator 420 comprises a lens to collimate the divergent light beam emerging from the input fiber port 421, which is generally secured inside a ferrule. Examples of lens include convex lens and gradient-index lens. The output optical collimator 460 has the same structure and configuration as the input optical collimator 420. In the fourth embodiment, both the collimated beams out of the input optical collimator 420 and output optical collimator 460 are aligned parallel to a longitudinal optical axis of the isolator assembly.

A wedge prism 470 having a tilted output surface 471 is inserted between the non-reciprocal polarization rotator 440 and the second polarization beam splitter/combiner 450 to provide the proper beam deflection. The material used for the wedge prism 470 may be any transparent optical glass such as BK7 and SF11. It is noted that although in the present embodiment, only the output surface 471 of the wedge prism 470 is tilted; the invention is not limited in scope in that respect. For example, the input surface of wedge 470 may also be tilted.

The first polarization beam splitter/combiner 430 comprises a birefringent material having a wedge profile, which defines a tilted input surface 431 and a tilted output surface 432. Examples of such birefringent materials include, but are not limited to, Calcite, YVO4, and Lithium niobate. An example of optic axis of the birefringent polarization beam splitter/combiner 430 lies on a plane transverse to the longitudinal optical axis of the isolator assembly. The second polarization beam splitter/combiner 450 having a tilted input surface 451 and a tilted output surface 452 has an identical structure to that of the first polarization beam splitter/combiner 430. The wedge angle of surface 451 is the same as that of surface 432 and the wedge angle of surface 452 is the same as that of surface 431. However, referring to FIG. 4A and FIG. 4B, wedge 430 and wedge 450 are configured opposing to each other in this optical isolator assembly. When projected on the transverse plane to the optical axis of the isolator assembly, the optic axis of the second birefringent polarization beam splitter/combiner 450 is rotated 45 degrees from the optic axis of the first polarization beam splitter/combiner 430 in opposite direction to polarization rotation afforded by the non-reciprocal polarization rotator 440 described below.

Non-reciprocal polarization rotator 440 comprises a magneto-optic rotator crystal or a magneto-optic rotator glass having permanent internal magnetic field, or alternatively in external magnet (not shown in the figure). The magnetic field is approximately along the direction of light propagation or the opposite direction. The rotator 440 rotates the polarization of incident light beam by 45 degrees. The non-reciprocal polarization rotator 440 may be any Faraday rotator crystal or Faraday rotator glass.

Referring to FIG. 4A, an input optical signal is launched into the input fiber port 421 and propagates along the forward direction 401. The input optical signal is collimated into a light beam via the input optical collimator 420. The collimated beam is then split into two orthogonally polarized beams, i.e., an o-ray 411 and an e-ray 412, by the first polarization beam splitter/combiner 430, which are both incident on the non-reciprocal polarization rotator 440. The wedge angles of surface 431 and surface 432 are chosen such that the angularly separated o-ray 411 and e-ray 412 cross each other, when projected onto the incidence plane, at a position before arriving at the second polarization beam splitter/combiner 450. The polarizations of the two beams are each rotated by 45 degrees after passing through the rotator 440, and, deflected by the wedge prism 470, then recombined by the second polarization beam splitter/combiner 450 having an optic axis of 45 degrees with respect to that of the first polarization beam splitter/combiner 430, wherein the o-ray 411 is now turned into e-ray 414 and the e-ray 412 is now turned into o-ray 413. The combined optical signal is coupled into the output fiber port 461 by the output optical collimator 460. FIG. 4A also shows the change of polarization direction viewed from input port 421 towards output port 461, as arrows inside circles.

The polarization mode dispersion is greatly reduced to minimal or even zero by the utilization of beam-crossing and o-ray/e-ray polarization switching. The total optical path lengths of the two beams split by the first polarization beam splitter/combiner 430 are the following: optical path length of o-ray 411 until the crossing point plus optical path length of e-ray 414 beyond the crossing point; and optical path length of e-ray 412 until the crossing point plus optical path length of o-ray 413 beyond the crossing point. When designing the structure, configuration and orientation of the components 420, 430, 440, 470, 450, and 460, the difference between the optical path length of o-ray 411 and the optical path length of e-ray 412 until the crossing point is compensated by the difference between the optical path length of e-ray 414 and the optical path length of o-ray 413 beyond the crossing point. Furthermore, in a special case, when the elements 420, 430, 440, 470, 450, and 460, are designed so that the total optical path lengths of the two beams are essentially identical, these beams are coupled into the output fiber port 461 simultaneously and the polarization mode dispersion is minimized.

Referring to FIG. 4B, in the reverse direction 402, an optical signal launched from the output fiber port 461 is collimated by the output optical collimator 460 and split into two polarized beams, o-ray 415 and e-ray 416, via the second polarization beam splitter/combiner 450, and deflected by the wedge prism 470. After passing through the rotator 440, and arriving at the first polarization beam splitter/combiner 430, because the rotation is non-reciprocal with the rotation in the forward direction 401, the rotated o-ray 415 becomes 418 which remains o-ray in polarization beam splitter/combiner 430, and the rotated e-ray 416 becomes 417 which remains e-ray in polarization beam splitter/combiner 430. Consequently, the beams emerging from the surface 431 are angularly deviated and cannot be coupled into the input fiber port 421 by the input optical collimator 420. The change of polarization direction viewed from input port 421 towards output port 461 is shown in FIG. 4B as arrows inside circles. In summary, the backward propagation of optical signal is blocked by the optical isolator assembly 400.

Figure 5A:
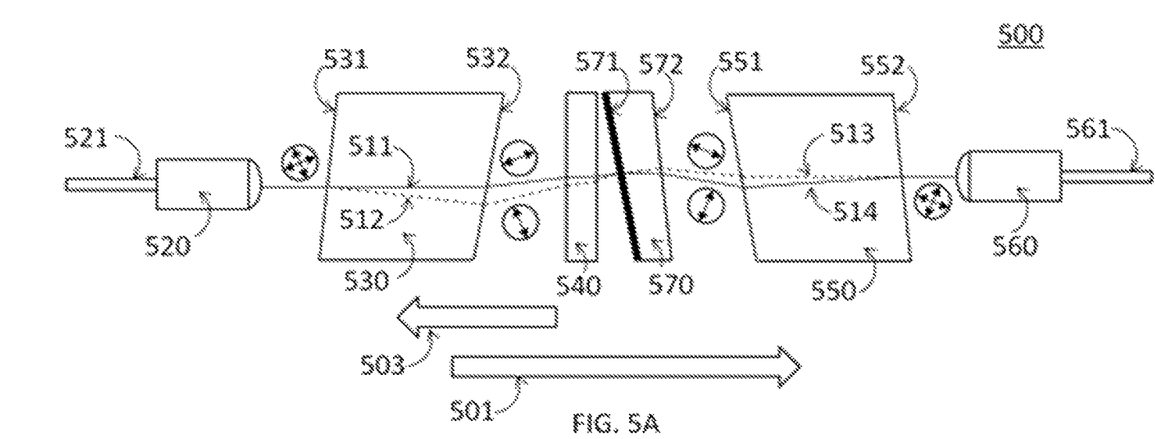
FIG. 5A and FIG. 5B are diagrams showing side view of forward and backward beam propagation through an optical assembly in accordance with yet another embodiment of the present disclosure.
Figure 5B:
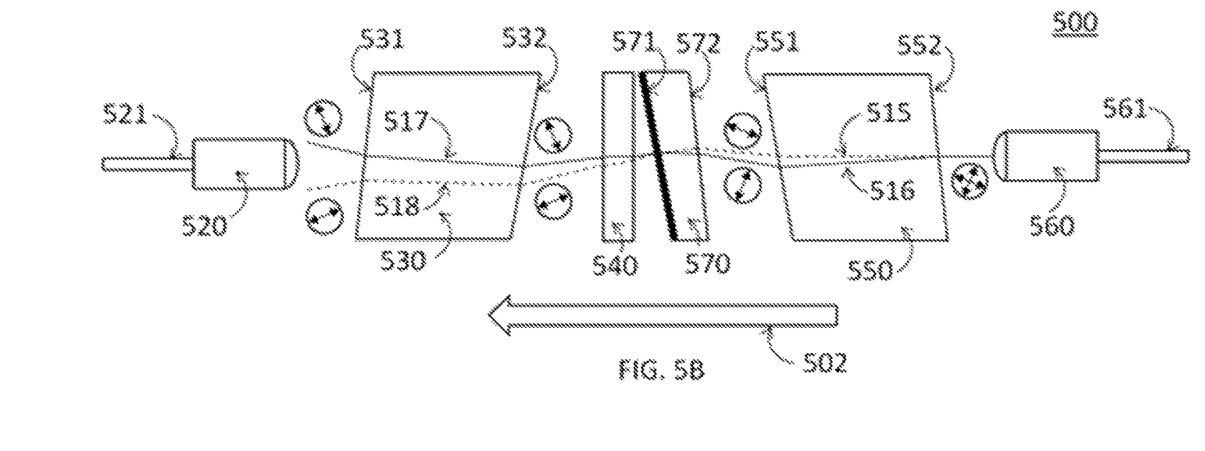

Each of FIG. 5A and FIG. 5B is a side view of an optical isolator assembly 500 according to a fifth embodiment of the invention. The embodiment differs from the first embodiment in the addition of one partially reflective wedge prism, 570, placed between the non-reciprocal polarization rotator and the second polarization beam splitter/combiner. The isolator assembly 500 includes an input optical collimator 520 having an input fiber port 521, a first polarization beam splitter/combiner 530 having a wedge profile with a tilted input surface 531 and a tilted output surface 532, a non-reciprocal polarization rotator 540, a wedge prism 570, a second polarization beam splitter/combiner 550 having a wedge profile with a tilted input surface 551 and a tilted output surface 552, and an output optical collimator 560 having an output fiber port 561.

Input optical collimator 520 comprises a lens to collimate the divergent light beam emerging from the input fiber port 521, which is generally secured inside a ferrule. Examples of lens include convex lens and gradient-index lens. The output optical collimator 560 has the same structure and configuration as the input optical collimator 520. In the fifth embodiment, both the collimated beams out of the input optical collimator 520 and output optical collimator 560 are aligned parallel to a longitudinal optical axis of the isolator assembly.

A wedge prism 570 having a tilted partially reflective input surface 571 and a tilted output surface 572 is inserted between the non-reciprocal polarization rotator 540 and the second polarization beam splitter/combiner 550 to provide the proper beam deflection and add extra function of Faraday rotator mirror to the optical assembly 500. The material used for the wedge prism 570 may be any transparent optical glass such as BK7 and SF11. An optical coating is applied to the input surface 571 with tailored reflectivity, which reflects a predetermined portion of the incident light beam while transmitting the remaining. It is noted that although in the present embodiment, the coating is on the input surface 571 of the wedge prism 570; the invention is not limited in scope in that respect. For example, the output surface 572 of wedge prism 570 may be coated instead.

The first polarization beam splitter/combiner 530 comprises a birefringent material having a wedge profile, which defines a tilted input surface 531 and a tilted output surface 532. Examples of such birefringent materials include, but are not limited to, Calcite, YVO4, and Lithium niobate. An example of optic axis of the birefringent polarization beam splitter/combiner 530 lies on a plane transverse to the longitudinal optical axis of the isolator assembly. The second polarization beam splitter/combiner 550 having a tilted input surface 551 and a tilted output surface 552 has an identical structure to that of the first polarization beam splitter/combiner 530. The wedge angle of surface 551 is the same as that of surface 532 and the wedge angle of surface 552 is the same as that of surface 531. However, referring to FIG. 5A and FIG. 5B, wedge 530 and wedge 550 are configured opposing to each other in this optical isolator assembly. When projected on the transverse plane to the optical axis of the isolator assembly, the optic axis of the second birefringent polarization beam splitter/combiner 550 is rotated 45 degrees from the optic axis of the first polarization beam splitter/combiner 530 in opposite direction to polarization rotation afforded by the non-reciprocal polarization rotator 540 described below.

Non-reciprocal polarization rotator 540 comprises a magneto-optic rotator crystal or a magneto-optic rotator glass having permanent internal magnetic field, or alternatively in external magnet (not shown in the figure). The magnetic field is approximately along the direction of light propagation or the opposite direction. The rotator 540 rotates the polarization of incident light beam by 45 degrees. The non-reciprocal polarization rotator 540 may be any Faraday rotator crystal or Faraday rotator glass.

Referring to FIG. 5A, an input optical signal is launched into the input fiber port 521 and propagates along the forward direction 501. The input optical signal is collimated into a light beam via the input optical collimator 520. The collimated beam is then split into two orthogonally polarized beams, i.e., an o-ray 511 and an e-ray 512, by the first polarization beam splitter/combiner 530, whose polarizations are each rotated by 45 degrees after passing through the rotator 540. The wedge angles of surface 531 and surface 532 are chosen such that the angularly separated o-ray 511 and e-ray 512 cross each other, when projected onto the incidence plane, at the input surface 571 of the wedge prism 570.

A predetermined portion of the power of both o-ray 511 and e-ray 512 are reflected by the surface 571 and propagate along the direction 503 which is opposite to 501. The wedge angle of surface 571 is chosen such that, when projected onto the incidence plane, a surface normal bisects the angle between the incident o-ray 511 and incident e-ray 512. As a result, the two beams exchange their optical paths after reflection, i.e., the reflected o-ray 511 propagates along the forward optical path of e-ray 512, and the reflected e-ray 512 propagates along the forward optical path of o-ray 511, in the direction 503. After passing through the non-reciprocal polarization rotator 540, the polarizations of both beams are rotated by another 45 degrees, which are then recombined by the first polarization beam splitter/combiner 530 and coupled into the first fiber port 521 via the first optical collimator 520. The polarization of the returned optical signal is therefore rotated by a total of 90 degrees with respect to that of the input optical signal. In this way, a built-in Faraday rotator mirror is realized for the reflected beam.

The remaining power of light beams transmits through the optical surface 571, which are deflected by the wedge prism 570, then recombined by the second polarization beam splitter/combiner 550 having an optic axis of 45 degrees with respect to that of the first polarization beam splitter/combiner 530, wherein the o-ray 511 is now turned into e-ray 514 and the e-ray 512 is now turned into o-ray 513. The combined optical signal is coupled into the output fiber port 561 by the output optical collimator 560. FIG. 5A also shows the change of polarization direction viewed from input port 521 towards output port 561, as arrows inside circles.

For the light beam transmitted through the optical coating on the surface 571 towards the output port 561, the polarization mode dispersion is greatly reduced to minimal or even zero by the utilization of beam-crossing and o-ray/e-ray polarization switching. The total optical path lengths of the two beams split by the first polarization beam splitter/combiner 530 are the following: optical path length of o-ray 511 until the crossing point plus optical path length of e-ray 514 beyond the crossing point; and optical path length of e-ray 512 until the crossing point plus optical path length of o-ray 513 beyond the crossing point. When designing the structure, configuration and orientation of the components 520, 530, 540, 570, 550, and 560, the difference between the optical path length of o-ray 511 and the optical path length of e-ray 512 until the crossing point is compensated by the difference between the optical path length of e-ray 514 and the optical path length of o-ray 513 beyond the crossing point. Furthermore, in a special case, when the elements 520, 530, 540, 570, 550, and 560, are designed so that the total optical path lengths of the two beams are essentially identical, these beams are coupled into the output fiber port 561 simultaneously and the polarization mode dispersion is minimized.

Referring to FIG. 5B, in the reverse direction 502, an optical signal launched from the output fiber port 561 is collimated by the output optical collimator 560 and split into two polarized beams, o-ray 515 and e-ray 516, via the second polarization beam splitter/combiner 550, and deflected by the wedge prism 570. Part of the light is reflected by the optical coating on the surface 571, which cannot reach the input fiber port 521 (the reflected beam is not plotted on FIG. 5B). As regards the transmitted light, after passing through the rotator 540, and arriving at the first polarization beam splitter/combiner 530, because the rotation is non-reciprocal with the rotation in the forward direction 501, the rotated o-ray 515 becomes 518 which remains o-ray in polarization beam splitter/combiner 530, and the rotated e-ray 516 becomes 517 which remains e-ray in polarization beam splitter/combiner 530. Consequently, the beams emerging from the surface 531 are angularly deviated and cannot be coupled into the input fiber port 521 by the input optical collimator 520. The change of polarization direction viewed from input port 521 towards output port 561 is shown in FIG. 5B as arrows inside circles. In summary, the backward propagation of optical signal is blocked by the optical assembly 500.

ADDITIONAL AND ALTERNATIVE IMPLEMENTATION NOTES

Although the techniques have been described in language specific to certain applications, it is to be understood that the appended claims are not necessarily limited to the specific features or applications described herein. Rather, the specific features and examples are disclosed as non-limiting exemplary forms of implementing such techniques. For example, wedge prism 470 may also be located in between the first polarization beam splitter/combiner 430 and the non-reciprocal polarization rotator 440, or any other position between two consecutive optical elements in this optical assembly with wedge angle modified.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

What is claimed is:
1. An optical isolator assembly, comprising:
  a first optical collimator;
  a first polarization beam splitter/combiner;
  a non-reciprocal polarization rotator;
  a second polarization beam splitter/combiner,
  a second optical collimator,
  wherein, with an optical signal received in the first optical collimator in a forward direction, a first incoming collimated optical beam emerges from the first optical collimator, passes through sequentially the first polarization beam splitter/combiner, the non-reciprocal polarization rotator and the second polarization beam splitter/combiner, and exits through the second optical collimator,
  wherein optical paths of two orthogonally polarized beams, an o-ray and an e-ray emerging from the first polarization beam splitter/combiner are configured to cross each other at a position, as projected on an incidence plane, before arriving at the second polarization beam splitter/combiner,
  wherein, with the optical signal received in the first optical collimator in the forward direction, polarizations of the two orthogonally polarized beams, the o-ray and the e-ray emerging from the first polarization beam splitter/combiner, are configured so that the o-ray from the first polarization beam splitter/combiner turns into an e-ray in the second polarization beam splitter/combiner and the e-ray from the first polarization beam splitter/combiner turns into an o-ray in the second polarization beam splitter/combiner,
  wherein, with another optical signal received in the second optical collimator in a reverse direction, a second incoming collimated optical beam from the second optical collimator passes through sequentially the second polarization beam splitter/combiner, the non-reciprocal polarization rotator and the first polarization beam splitter/combiner, and emerge as two angularly deviated orthogonally polarized beams due to the non-reciprocal polarization rotator, and wherein the two angularly deviated orthogonally polarized beams cannot be coupled into the first optical collimator.

2. The optical isolator assembly of claim 1, wherein each of the first optical collimator and the second optical collimator comprises a fiber pigtail and a collimator lens, and wherein a collimated optical beam emerges from each of the first optical collimator and the second optical collimator in an angle relative to a mechanical axis of the respective optical collimator.

3. The optical isolator assembly of claim 1, wherein each of the first optical collimator and the second optical collimator comprises a fiber pigtail and a collimator lens, and wherein a collimated optical beam emerges from each of the first optical collimator and the second optical collimator aligned to a mechanical axis of the respective optical collimator.

4. The optical isolator assembly of claim 1, wherein each of the first polarization beam splitter/combiner and the second polarization beam splitter/combiner comprises a birefringent crystal wedge.

5. The optical isolator assembly of claim 1, wherein each of the first polarization beam splitter/combiner and the second polarization beam splitter/combiner comprises a birefringent crystal wedge with an optic axis on a plane transverse to an optical axis of the optical isolator assembly.

6. The optical isolator assembly of claim 1, wherein an optic axis of the second polarization beam splitter/combiner is rotated 45 degrees from an optic axis of the first polarization beam splitter/combiner when projected on a plane transverse to an optical axis of the optical isolator assembly.

7. The optical isolator assembly of claim 1, wherein the second polarization beam splitter/combiner is identical to the first polarization beam splitter/combiner.

8. The optical isolator assembly of claim 1, wherein the non-reciprocal polarization rotator rotates a polarization of an incoming light beam by 45 degrees.

9. The optical isolator assembly of claim 1, wherein the non-reciprocal polarization rotator comprises a Faraday rotating crystal.

10. The optical isolator assembly of claim 1, wherein the non-reciprocal polarization rotator is a Faraday rotating glass.

11. The optical isolator assembly of claim 1, further comprising:
    a first wedge prism disposed between the first optical collimator and the first polarization beam splitter/combiner; and
    a second wedge prism disposed between the second polarization beam splitter/combiner and the second optical collimator.

12. The optical isolator assembly of claim 1, further comprising:
    a first wedge prism disposed between the first polarization beam splitter/combiner and the non-reciprocal polarization rotator; and
    a second wedge prism disposed between the non-reciprocal polarization rotator and the second polarization beam splitter/combiner.

13. The optical isolator assembly of claim 1, further comprising:
    a first wedge prism disposed between two consecutive optical elements comprising the first optical collimator, the first polarization beam splitter/combiner, the non-reciprocal polarization rotator, the second polarization beam splitter/combiner, and the second optical collimator.

14. The optical isolator assembly of claim 1, further comprising:
    a first wedge prism disposed between the non-reciprocal polarization rotator and the second polarization beam splitter/combiner,
    wherein a partially reflective optical coating is applied to an input surface of the first wedge prism,
    wherein, with the optical signal received in the first optical collimator in the forward direction, polarizations of the two orthogonally polarized beams, the o-ray and the e-ray emerging from the first polarization beam splitter/combiner, are configured so that the o-ray from the first polarization beam splitter/combiner turns into an e-ray in the first polarization beam splitter/combiner and the e-ray from the first polarization beam splitter/combiner turns into an o-ray in the first polarization beam splitter/combiner on the reflected paths, and
    wherein, the two orthogonally polarized beams, the o-ray and the e-ray emerging from the first polarization beam splitter/combiner exchange paths, as projected on an incidence plane to the first polarization beam splitter/combiner.

* * * * *